US009141897B2

(12) United States Patent
Miyamoto et al.

(10) Patent No.: US 9,141,897 B2
(45) Date of Patent: Sep. 22, 2015

(54) IMAGE FORMING APPARATUS AND METHOD OF CONTROLLING SAME

(71) Applicant: KYOCERA DOCUMENT SOLUTIONS INC., Osaka (JP)

(72) Inventors: Naruyuki Miyamoto, Osaka (JP); Yukio Tanisaki, Osaka (JP); Kentaro Naruse, Osaka (JP); Rie Tezuka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 2 days.

(21) Appl. No.: 13/929,118

(22) Filed: Jun. 27, 2013

(65) Prior Publication Data
US 2014/0002844 A1 Jan. 2, 2014

(30) Foreign Application Priority Data

Jun. 29, 2012 (JP) ................. 2012-147726

(51) Int. Cl.
*G06K 15/00* (2006.01)
*G06F 1/32* (2006.01)
*H04N 1/00* (2006.01)

(52) U.S. Cl.
CPC .......... *G06K 15/4055* (2013.01); *G06F 1/3231* (2013.01); *G06F 1/3284* (2013.01); *H04N 1/00885* (2013.01); *Y02B 60/1267* (2013.01); *Y02B 60/1289* (2013.01); *Y02B 60/32* (2013.01)

(58) Field of Classification Search
CPC ............. G06K 15/4055; G06F 1/3284; H04N 1/00885
See application file for complete search history.

(56) References Cited

U.S. PATENT DOCUMENTS

| 4,800,368 A | 1/1989 | Wisner |
| 2009/0067676 A1 | 3/2009 | Kempf et al. |
| 2012/0127538 A1 | 5/2012 | Mamiya et al. |
| 2012/0137154 A1* | 5/2012 | Azuma et al. ................. 713/323 |

FOREIGN PATENT DOCUMENTS

JP        2000-066805 A        3/2000

OTHER PUBLICATIONS

Wojtczuk et al., "Recognition of Simple Gestures Using a PIR Sensor Array", Sensors & Transducers Journal, Mar. 12, 2012, pp. 83-94, vol. 14 No. 1, International Frequency Sensor Association (IFSA). English Abstract and Translation for JP 2000-066805 A, published Mar. 3, 2000.

* cited by examiner

*Primary Examiner* — Saeid Ebrahimi Dehkord
*Assistant Examiner* — Lennin Rodriguezgonzale
(74) *Attorney, Agent, or Firm* — NDQ&M Watchstone LLP (57) ABSTRACT

A signal generation portion of an image forming apparatus generates a different level of signal according to an output value of a pyroelectric sensor. A recognition portion determines a measurement value on the speed of change of the signal and recognizes which of a first range and a second range the measurement value is. In a power supply portion, when the measurement value falls within the first range in a mode other than a power-saving mode, and the image forming apparatus is brought into the power-saving mode, and, when the measurement value falls within the second range in the power-saving mode, the power-saving mode is cancelled.

18 Claims, 8 Drawing Sheets

|  | FREQUENCY (Hz) | PERIOD(s) | INTERVAL(s) |
|---|---|---|---|
| LOW-SPEED RANGE | $0 \leq f < f_1$ | $t_2 \leq t$ | $t_4 \leq t$ |
| FIRST RANGE | $f_1 \leq f < f_2$ | $t_1 \leq t < t_2$ | $t_3 \leq t < t_4$ |
| SECOND RANGE | $f_2 \leq f$ | $0 \leq t < t_1$ | $0 \leq t < t_3$ |

IMAGE FORMING APPARATUS AND METHOD OF CONTROLLING SAME

This application is based upon and claims the benefit of priority from the corresponding Japanese Patent Application No. 2012-147726 filed on Jun. 29, 2012, the entire contents of which are incorporated herein by reference.

BACKGROUND

The present disclosure relates to an image forming apparatus that utilizes heat (infrared rays) released from a human body (hereinafter also referred to as a "person" or a "user") to detect the movement of the human body and that transfers to a power-saving mode or cancels the power-saving mode.

Conventionally, in order to detect the movement of a person such as whether a person is present or whether a person is approaching, an infrared sensor that detects infrared rays may be used. For example, in a management system of a building or the like, an infrared sensor is used to perform management control and the like on security, air conditioning and illumination. With a plurality of infrared sensors, a specific human gesture (for example, waving their hand in a leftward direction) may be detected.

Specifically, an infrared detection input device is known that includes: a plurality of infrared detection elements which detect infrared rays emitted from a human body to convert them into electrical signals; a characteristic extraction portion in which the infrared detection regions of the infrared detection elements are arranged on a flat surface a predetermined distance apart and in which the characteristic of a waveform is extracted from the electrical signals converted by the infrared detection elements; a determination portion which determines the movement of a specific part of the human body based on the extracted characteristic; and a filter portion which filters the electrical signals, the characteristic extraction portion extracting, as the characteristic, the size of each waveform filtered and the transition state of each waveform filtered. Thus, only the movement of the specific part of the human body in a specific direction attempts to be recognized.

Conventionally, with an infrared sensor alone like a pyroelectric sensor, it is possible to detect only whether or not a person is present within a detection area (whether or not a human body is present). Hence, conventionally, when the direction of movement or the like is detected as in the known technology described above, a plurality of infrared sensors are arranged.

However, when a plurality of sensors are arranged, the manufacturing cost of the device is increased. Since in the known technology described above, a filter portion is also provided in each of the sensors, the circuits of the sensors, filters and the like are included, and thus the manufacturing cost is increased.

Furthermore, conventionally, with respect to the output of an infrared sensor such as a pyroelectric sensor, for example, in order to remove noise, a low-pass filter or a band-pass filter is used to extract only a desired frequency component from the output of the sensor. Then, based on a signal waveform obtained by passing the output through the filter, whether or not the human body is present within a detection region or a specific movement is detected. However, since the output is passed through the filter, and only part of the components of the signal are used, it is frequent that a predetermined type of limited movement can only be detected.

As described above, conventionally, in the detection of the movement of a person with an infrared sensor, since the manufacturing cost is increased, it is disadvantageously impossible to inexpensively, simply and accurately recognize the movement of the person.

SUMMARY

To overcome the foregoing problem, an image forming apparatus includes a pyroelectric sensor, a signal generation portion, a recognition portion and a power supply portion. The signal generation portion receives an output of the pyroelectric sensor to generate a different level of signal according to whether or not an output value of the pyroelectric sensor exceeds a predetermined threshold value. The recognition portion receives the signal generated by the signal generation portion, determines a measurement value on the speed of change of the signal and recognizes to which of a predetermined first range and a predetermined second range different from the first range the determined measurement value belongs. In the power supply portion, when the determined measurement value falls within the first range in a mode other than a power-saving mode, the image forming apparatus is brought into the power-saving mode in which power is supplied to only part of the image forming apparatus, and, when the determined measurement value falls within the second range in the power-saving mode, power supply is restarted to all or part of portions to which power has been stopped to be supplied in the power-saving mode, and the power-saving mode is cancelled.

Further features and advantages of the present disclosure will become apparent from the description of embodiments given below.

DETAILED DESCRIPTION

An embodiment of the present disclosure will be described below with reference to FIGS. 1 to 9. In the present embodiment, a description will be given using a multifunctional machine 100 (corresponding to an image forming apparatus) as an example. The multifunctional machine 100 can perform a plurality of types of jobs (functions) such as copying, printing and scan transmission. However, elements such as configurations and arrangements described in the present embodiment are not intended to limit the scope of the disclosure; they are simply illustrative examples.

(Schematic Configuration of the Multifunctional Machine 100)

Figure 1:
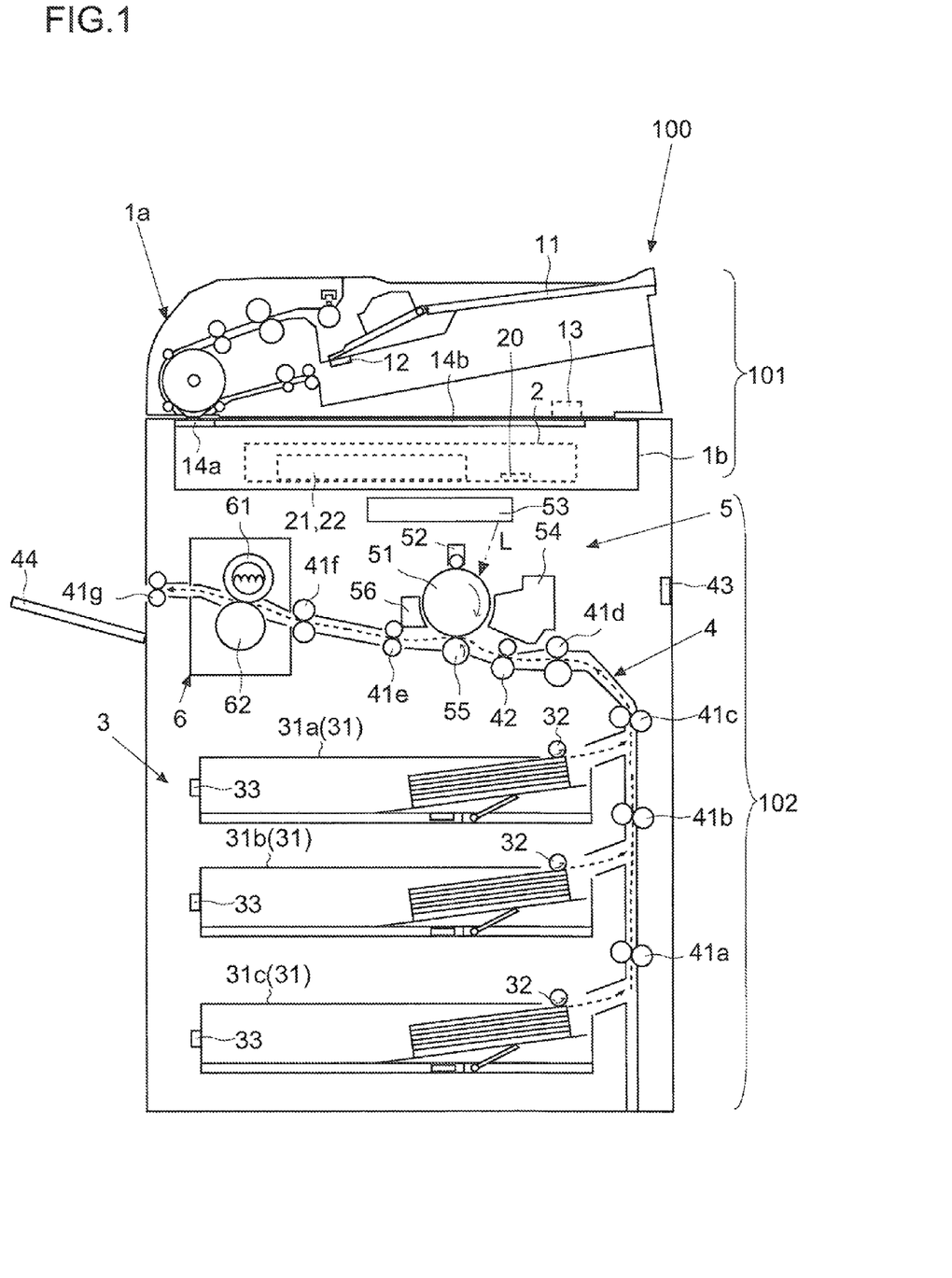
FIG. 1 is a diagram showing a multifunctional machine.

The outline of the multifunctional machine 100 according to the embodiment will first be described with reference to FIG. 1. FIG. 1 is a diagram showing the multifunctional machine 100.

In the uppermost portion of the multifunctional machine 100, a reading portion 101 (image reading device) including an original document transport portion 1a and an image reading portion 1b is provided. The original document transport portion 1a transports original documents stacked on an original document placement tray 11 one-by-one to the reading position (an upper position of a feeding/reading contact glass 14a) of the image reading portion 1b. In the original document placement tray 11, an original document placement detection sensor 12 for detecting that the original document is placed is provided. The original document placement detection sensor 12 produces different outputs depending on whether or not the original document is placed.

With a fulcrum (not shown) provided in the back of the plane of paper, it is possible to raise and open the original document transport portion 1a. As indicated by broken lines of FIG. 1, an open/close detection sensor 13 for detecting whether the original document transport portion 1a is opened or closed is provided. The open/close detection sensor 13 may be an interlock-type switch in contact with the lower surface of the original document transport portion 1a or a reflection-type optical sensor. The output of the open/close detection sensor 13 is changed depending on the open/close state of the original document transport portion 1a.

When a job of copying, scan or image data transmission is performed, the image reading portion 1b reads the original document to generate image data. On the upper surface of the image reading portion 1b, contact glasses 14 (two types; 14a and 14b) are provided. Inside the image reading portion 1b, a movement frame (incorporating an exposure lamp, a mirror and the like) that moves in a horizontal direction (in FIG. 1, a left/right direction) and optical system members (each of which is not shown) such as a lens and an image sensor (CCD) are provided. When the original document transported by the original document transport portion 1a is read, the movement fame is fixed below the feeding/reading contact glass 14a, and light reflected off the original document is guided to the lens and the image sensor. When the original document placed on the placement reading contact glass 14b is read, the movement frame is moved in the horizontal direction, and the light reflected off the original document is guided to the lens and the image sensor.

Then, the image reading portion 1b uses these optical system members to apply light to the original document, and performs A/D conversion on the output value of each pixel of the image sensor receiving the light reflected off the original document to generate the image data. Then, the multifunctional machine 100 can perform printing and transmission based on the read image data (copying and transmission functions).

As indicated by broken line of FIG. 1, in an upper portion of the front surface, an operation panel 2 that receives the inputs of the settings of copying and the like and of execution instructions and displays various types of information is provided. In a side end portion of the front surface of the operation panel 2, a pyroelectric sensor 20 is provided. The detection of the gesture of a user with the pyroelectric sensor 20 will be described in detail later.

Within the main body of the multifunctional machine 100, a print engine portion 102 including a paper feed portion 3, a transport portion 4, an image formation portion 5 and a fixing portion 6 is provided. The print engine portion 102 performs printing on a sheet based on the image data.

In the paper feed portion 3, in total, three cassettes 31 (31a, 31b and 31c) that hold and feed sheets are stacked in the vertical direction. The paper feed portion 3 stacks and holds a plurality of sheets. In each of the cassettes 31 (31a to 31c), a paper feed roller 32 that is driven to rotate for paper feed is individually provided. Each of the cassettes 31 can be inserted and removed for paper supply. In order to detect the attachment and the removal of each of the cassettes 31, an insertion/removal detection sensor 33 is provided. The insertion/removal detection sensor 33 may be an interlock-type switch in contact with one surface of each of the cassettes 31 or a reflection-type optical sensor; its output is changed according to the insertion and removal of the cassette.

The transport portion 4 is a passage along which the sheet is transported within the apparatus. In the transport portion 4, a plurality of transport roller pairs 41 (in FIG. 1, in total, seven transport roller pairs 41a to 41g are shown from the upstream side) that are driven to rotate, a register roller pair 42 that places the sheet being transported on standby in front of the image formation portion 5 and that feeds out the sheet so as to match the timing of transfer of a formed toner image and the like are provided.

In order to remove the sheet caught and perform maintenance, the front cover (not shown) of the multifunctional machine 100 of the present embodiment can be opened and closed. In order to detect the opening and closing of the front cover, a cover open/close detection sensor 43 is provided. The cover open/close detection sensor 43 may be an interlock-type switch in contact with part of the front cover or an optical sensor; its output is changed according to the opening and closing of the front cover.

The image formation portion 5 forms the image (toner image) based on the image data, and transfers the toner image to the sheet transported from the paper feed portion 3. As the image data, image data on the original document acquired from the image reading portion 1b and image data received from a computer 200 (see FIG. 2) and a fax machine 300 are utilized. The image formation portion 5 includes a photoconductor drum 51 that is driven to rotate, a charging device 52, an exposure device 53, a development device 54, a transfer roller 55 and a cleaning device 56 arranged around the photoconductor drum 51.

The charging device 52 charges the rotating photoconductor drum 51 such that the photoconductor drum 51 has a predetermined potential. The exposure device 53 outputs laser light L based on the image data, and forms an electrostatic latent image corresponding to the image data on the surface of the photoconductor drum 51. Then, the development device 54 feeds the toner to the electrostatic latent image on the photoconductor drum 51 to develop it. Then, the register roller pair 42 makes the sheet enter a nip between the transfer roller 55 and the photoconductor drum 51 at appropriate timing. When the sheet and the toner image enter the nip, a predetermined voltage is applied to the transfer roller 55, and the toner image on the photoconductor drum 51 is transferred to the sheet. The cleaning device 56 removes the toner and the like left on the photoconductor drum 51 after the transfer.

The fixing portion 6 includes a heating roller 61 incorporating a heating member and a pressurization roller 62. The fixing portion 6 fixes the toner image transferred to the sheet. The sheet on which the toner has been fixed is ejected into an ejection tray 44.

(Hardware Configuration of the Multifunctional Machine 100)

Figure 2:
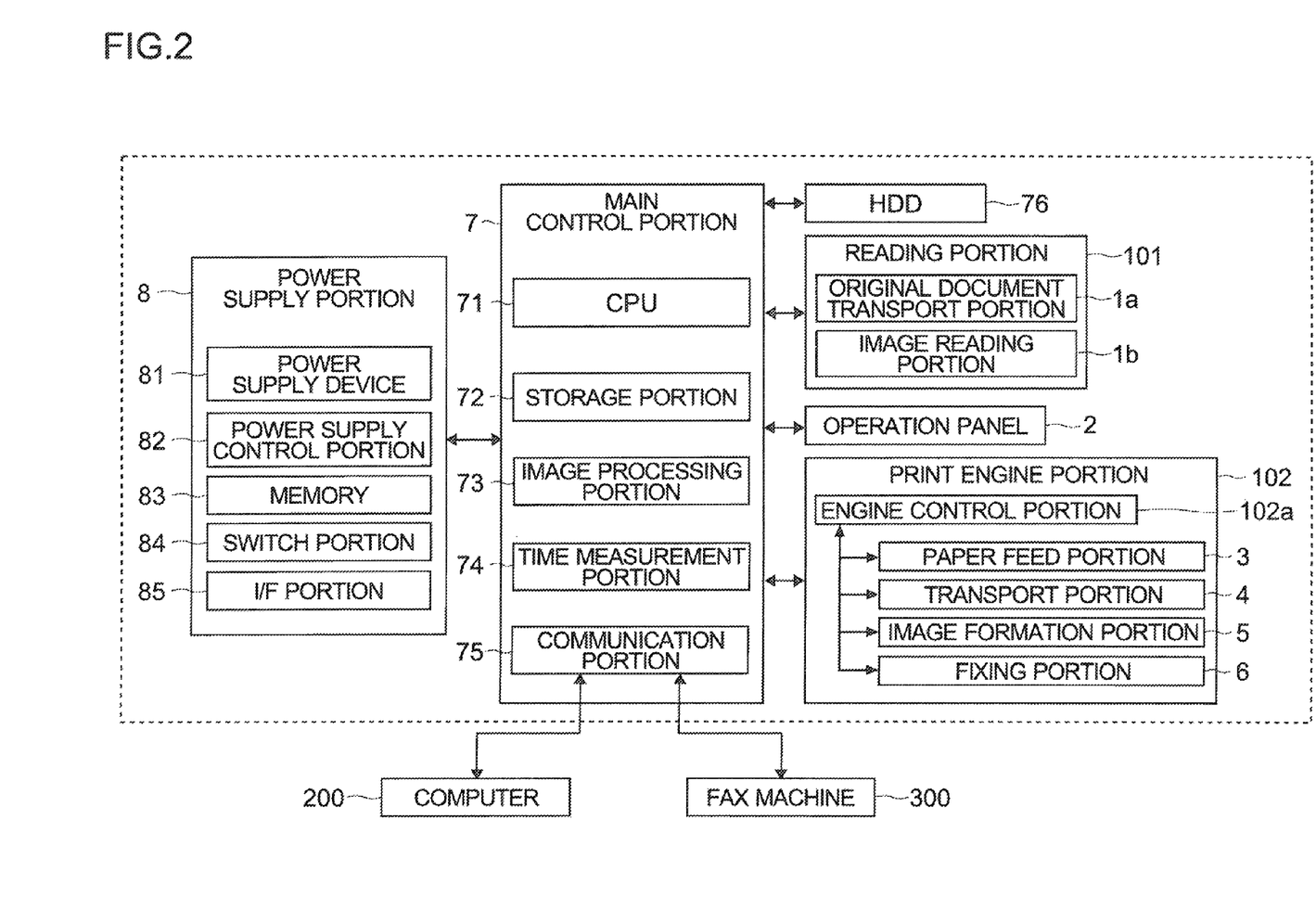
FIG. 2 is a diagram showing the hardware configuration of the multifunctional machine.

With reference to FIG. 2, the hardware configuration of the multifunctional machine 100 according to the embodiment will now be described. FIG. 2 is a diagram showing the hardware configuration of the multifunctional machine 100.

As shown in FIG. 2, the multifunctional machine 100 includes a main control portion 7 (corresponding to a recognition portion) that is formed by combining various types of elements, circuits and the like. The main control portion 7 includes a CPU 71, a storage portion 72, an image processing portion 73, a time measurement portion 74 and a communication portion 75. The main control portion 7 is connected to the reading portion 101, the operation panel 2, the print engine portion 102, a power supply portion 8 and the like such that the main control portion 7 can communicate with them, performs communication and controls operations.

The CPU 71 is an arithmetic processing unit of the main control portion 7. The CPU 71 performs processing and control based on data and programs stored in the storage portion 72. The storage portion 72 includes a nonvolatile storage device (flash ROM) and a volatile storage device (RAM). The storage portion 72 stores data and programs necessary for various types of control on jobs. As a large-capacity storage device, a HDD 76 can be connected to the main control portion 7. The main control portion 7 can utilize the HDD 76 as one of the storage devices. The HDD 76 stores not only the data and programs necessary for various types of control but also the image data and the like.

The image processing portion 73 performs image processing on the image data generated in the image reading portion 1b and image data input from outside. The image processing portion 73 is formed with an ASIC dedicated for image processing and a memory for image processing. The image data after the image processing can be fed to the exposure device 53 for printing (a copying function and a printer function), can be stored in the HDD 76 (a scanner function) or can be transmitted from the communication portion 75 to the outside (such as the computer 200 or the fax machine 300) (the scanner and the transmission function of the facsimile). The image processing portion 73 may be functionally realized by the CPU 71 and the storage portion 72.

The time measurement portion 74 is a circuit that measures time. The communication portion 75 is an interface with which to communicate with the external computer 200 (such as a personal computer or a server) or the fax machine 300 through a network, a line, a cable or the like.

With respect to the reading of the original document, the main control portion 7 is connected to the reading portion 101 (the image reading portion 1b and the original document transport portion 1a) such that the main control portion 7 can communicate with the reading portion 101. When the jobs on the copying and the transmission of the image data are performed, the image reading portion 1b and the original document transport portion 1a receive an instruction from the main control portion 7 to perform the job on the reading of the original document.

The main control portion 7 is connected to the operation panel 2 on which the input of settings to the multifunctional machine 100 and the display are performed such that the main control portion 7 can communicate with the operation panel 2. The operation panel 2 transmits, to the main control portion 7, the pressing of a key and the type of key pressed. Thus, the main control portion 7 recognizes which one of the hard keys on the operation panel 2 and the keys displayed on a liquid crystal display portion 21 is pressed.

In the multifunctional machine 100, the print engine portion 102 is provided as a portion that performs a print job. Within the print engine portion 102, an engine control portion 102a that receives an instruction from the main control portion 7 and that actually controls the operation of the print engine portion 102 is provided. The engine control portion 102a includes a CPU and a memory that stores programs and data for print control. The engine control portion 102a controls members (for example, a motor, a circuit and a heater) included in the print engine portion 102, such as paper feed, transport, toner image formation and temperature control on the fixing portion 6.

As a portion on power management in the multifunctional machine 100, the power supply portion 8 is provided. The power supply portion 8 controls power supply to individual portions within the multifunctional machine 100. The power supply portion 8 includes a power supply control portion 82 (a CPU or a microcomputer) that controls a power supply device 81 and a switch portion 84 to perform power supply control, a memory 83 that stores data and programs for the power supply portion 8, the switch portion 84 and an I/F portion 85.

The power supply device 81 is connected to a commercially available power supply, includes a rectification circuit, a step-up circuit and a step-down circuit and generates a plurality of types of voltages necessary for the operation of the multifunctional machine 100. The switch portion 84 performs the turning on and off of power supply to the individual portions of the multifunctional machine 100 such as the reading portion 101 and the print engine portion 102. In other words, the power supply portion 8 (the power supply control portion 82) uses the switch portion 84 to open and close power supply lines from the power supply device 81 to the reading portion 101, the print engine portion 102 and the like, and thereby controls the turning on and off of the power supply to the individual portions. The I/F portion 85 is an interface through which to communicate with the main control portion 7 and the like.

(Detection of a Gesture by the Pyroelectric Sensor 20)

Figure 3:
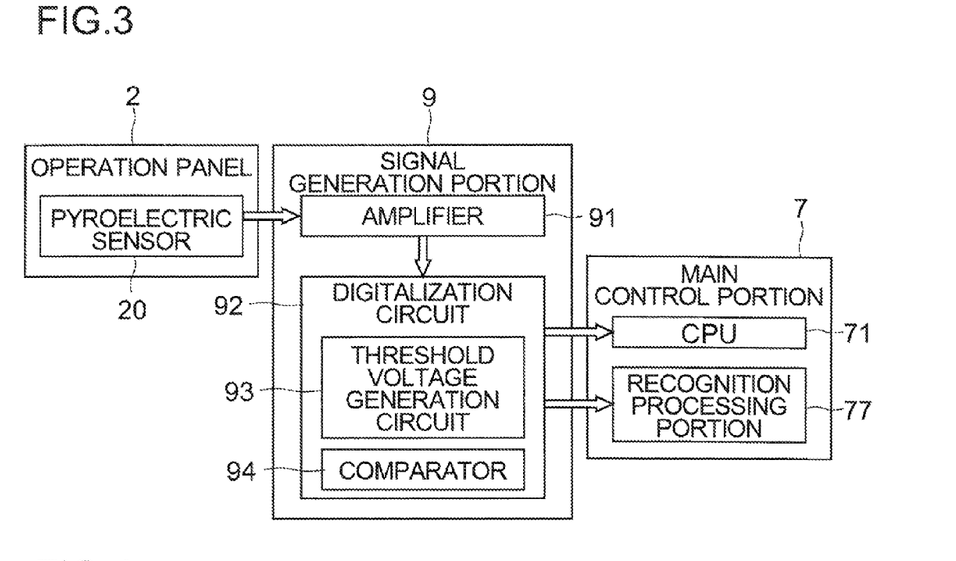
FIG. 3 is a diagram showing the flow of processing on the output of a pyroelectric sensor.
Figure 4:
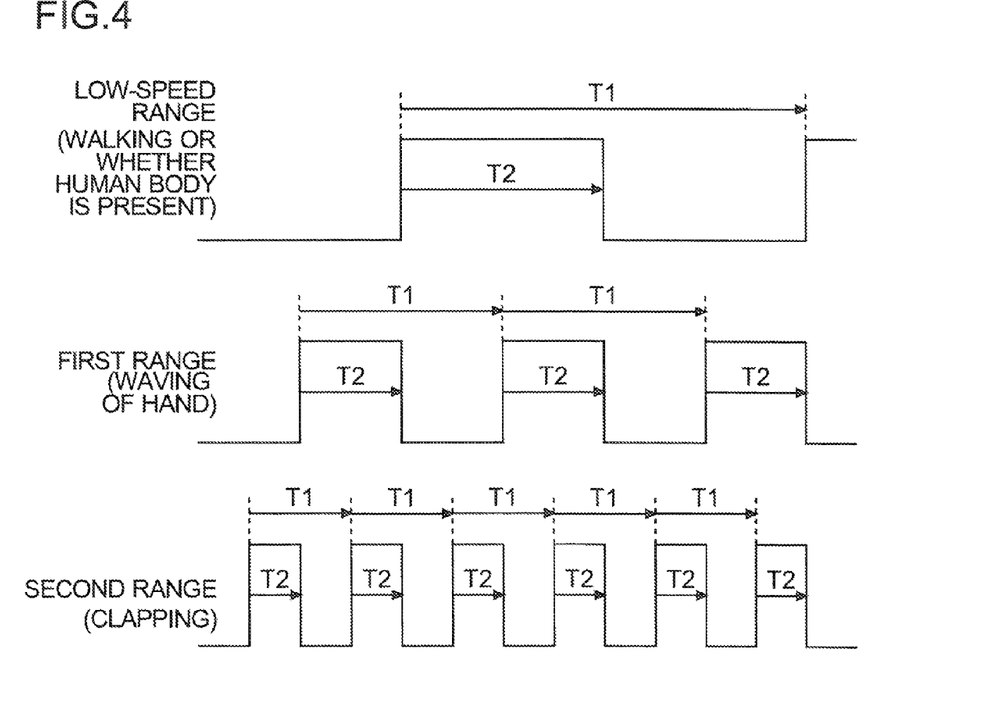
FIG. 4 is a timing chart showing signals output by a signal generation portion.
Figure 5:
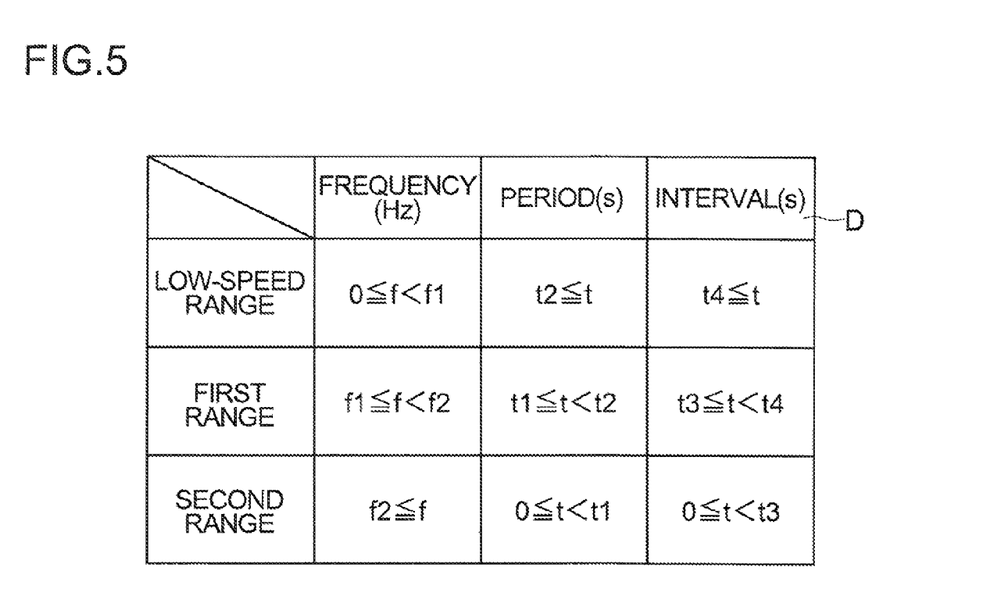
FIG. 5 is an illustrative diagram showing determination data for recognizing to which range a determined measurement value belongs.

Detection of the gesture of the user with the pyroelectric sensor 20 will now be described with reference to FIGS. 3 to 5. FIG. 3 is a diagram showing the flow of processing on the output of the pyroelectric sensor 20. FIG. 4 is a timing chart of signals output by a signal generation portion 9. FIG. 5 is an illustrative diagram showing determination data D for recognizing to which range a determined measurement value belongs.

The flow of the processing on the output of the pyroelectric sensor 20 will be described below with reference to FIG. 3. As shown in FIG. 3, as a portion that performs the processing on the output of the pyroelectric sensor 20, the signal generation portion 9 is provided. As a portion that detects the details of a gesture based on a signal generated by the signal generation portion 9, the main control portion 7 is provided.

The pyroelectric sensor 20 is a sensor that utilizes the pyroelectric effect in which, when a dielectric is heated, dielectric polarization occurs, and charge is produced on the surface. The pyroelectric sensor 20 of the present embodiment is a pyroelectric infrared sensor in which its output voltage changes according to variations in the amount of infrared ray received from a human body. Since the pyroelectric sensor 20 of the present embodiment is not a type of infrared sensor that emits infrared rays, the pyroelectric sensor 20 consumes only a small amount of power consumption.

The pyroelectric sensor 20 of the present embodiment is provided in the operation panel 2. In order to efficiently receive infrared rays emitted from the user, the pyroelectric sensor 20 is provided in a side end portion of the front surface of the operation panel 2 (see FIG. 1).

The output of the pyroelectric sensor 20 is input to the signal generation portion 9. In the signal generation portion 9, an amplifier 91 that amplifies the output voltage of the pyroelectric sensor 20 is provided. Then, the output of the pyroelectric sensor 20 amplified by the amplifier 91 is input to a digitalization circuit 92 within the signal generation portion 9.

The digitalization circuit 92 generates a different level of signal according to whether or not the output value of the pyroelectric sensor 20 after the amplification exceeds a predetermined threshold value. The digitalization circuit 92 includes a threshold voltage generation circuit 93 that generates a threshold voltage and a comparator 94 that compares the output value of the pyroelectric sensor 20 after the amplification and the threshold value. While the output of the pyroelectric sensor 20 after the amplification exceeds the threshold value, the digitalization circuit 92 outputs a high-level signal whereas, while the output of the pyroelectric sensor 20 after the amplification is equal to or less than the threshold value, the digitalization circuit 92 outputs a low-level signal. The logic of the high-level signal and the low-level signal may be opposite.

The signal generation portion 9 may be provided outside the operation panel 2. The signal generation portion 9 may be provided within the operation panel 2 or may be provided on a substrate within the main control portion 7; its installation place is not particularly limited.

Then, the signal generated by the signal generation portion 9 is input to the main control portion 7. The waveform of the signal input to the main control portion 7 is changed according to a gesture or an operation performed on the pyroelectric sensor 20. This point will be described with reference to FIG. 4.

The timing chart on the uppermost stage of FIG. 4 shows the waveform of a signal obtained by detecting the walking user with the pyroelectric sensor 20. When the walking user is moving toward the multifunctional machine 100 or the walking user is crossing the detection area of the pyroelectric sensor 20, the movement of the user is relatively slow. Hence, based on the output of the pyroelectric sensor 20, the frequency of a signal generated by the signal generation portion 9 is about 1 to 2 Hz.

The timing chart on the middle stage of FIG. 4 shows the waveform of a signal obtained by intentionally performing a gesture (for example, waving a hand) faster than in walking. For example, when an arm or a hand is waved rapidly, the speed of change of infrared rays (heat received from the human body) input to the pyroelectric sensor 20 is higher than in walking. Based on the output of the pyroelectric sensor 20 when the hand is waved toward the pyroelectric sensor 20, the frequency of change of a signal generated by the signal generation portion 9 is about 4 to 10 Hz.

The timing chart on the lowermost stage of FIG. 4 shows the waveform of a signal obtained by intentionally performing a gesture (for example, clapping) faster than when the hand is waved. The speed of change of infrared rays (the heat received from the human body) input to the pyroelectric sensor 20 is higher than when an arm or a hand is waved. Based on the output of the pyroelectric sensor 20 when clapping is performed onto the pyroelectric sensor 20, the frequency of change of a signal generated by the signal generation portion 9 is about 8 to 11 Hz.

Then, the main control portion 7 determines a measurement value on the speed of change of the signal based on the waveform of the signal generated by the signal generation portion 9. Although, with the CPU 71 and the time measurement portion 74 within the main control portion 7, it is possible to perform processing and computation for determining the measurement value, dedicated hardware (shown as a "recognition processing portion 77" in FIG. 3) may be provided within the main control portion 7. The main control portion 7 counts, for example, a time T1 (period) from the rising edge of the signal to the subsequent rising edge (for example, the time measurement portion 74 performs the time measurement). In other words, the period of change of the high level and the low level of the signal is determined.

The main control portion 7 may determine the period as the measurement value. The time T1 (period) from the rising edge of the signal to the subsequent rising edge is counted, and thus a time of one period may be determined as the measurement value. Alternatively, the main control portion 7 counts (measures) the time T1 of a plurality of periods, divides the time T1 of the periods by the number of periods counted and thereby determines the average value of the periods, with the result that the determined average value of the periods may be defined as the measurement value.

The main control portion 7 may determine a frequency as the measurement value. The main control portion 7 counts the time T1 (period) from the rising edge of the signal to the subsequent rising edge and determines a frequency by obtaining the reciprocal of the time T1 of one period, with the result that the main control portion 7 may define the frequency as the measurement value. Alternatively, the main control portion 7 counts (measures) the time of a plurality of periods, divides the time T1 of the periods by the number of periods counted and thereby determines the average value of the periods and determines a frequency by obtaining the reciprocal of the average value of the determined periods, with the result that the main control portion 7 may define the determined frequency as the measurement value. In other words, the average of the frequencies of a plurality of cycles is determined, and thus the average value of the determined frequencies may be defined as the measurement value.

The main control portion 7 may determine, as the measurement value, an interval T2 from an edge of the signal to an edge (for example, the interval T2 from the rising edge to the falling edge). The interval T2 (time) from the rising edge of the signal to the falling edge is counted (measured), and the time of one convex waveform counted may be defined as the measurement value. Alternatively, the main control portion 7 counts, a plurality of times, the interval T2 (time) from the rising edge of the signal to the falling edge, and determines the average value of the intervals T2 counted, with the result that the main control portion 7 may define the determined average value as the measurement value.

These measurement values are values on the quickness of the movement of the person detected by the pyroelectric sensor 20. The quicker the movement becomes, the higher the frequency becomes, and the lower the period and the interval become. Hence, based on the output from the pyroelectric sensor 20, the control portion 1 acquires, as the measurement value, the quickness of the gesture detected by the pyroelectric sensor 20.

Then, the main control portion 7 recognizes to which range the determined measurement value belongs. In the storage portion 72 of the main control portion 7, the determination data D as shown in FIG. 5 is previously stored. Then, the main control portion 7 recognizes, based on the determination data D, to which range the measurement value belongs. FIG. 5 shows, on each of the frequency, the period and the interval, the determination data D in which the value range is determined. However, when the frequency is determined as the measurement value, only part of the determination data D on the frequency is preferably provided; when the period is determined as the measurement value, only part of the determination data D on the period is preferably provided; when the interval is determined as the measurement value, only part of the determination data D on the interval is preferably provided.

Then, as the range of the measurement value, a low-speed range is determined. The low-speed range is a range that is previously determined as the range of the measurement value when the measurement value is determined based on a signal obtained when the walking user is detected by the pyroelectric sensor 20. When the determined measurement value falls within the low-speed range, the main control portion 7 recognizes that a walking person is detected by the pyroelectric sensor 20.

Furthermore, as the range of the measurement value, a first range and a second range are previously determined. Specifically, the first range and the second range are defined to acquire a gesture that is quicker than the walking of the person and that is intentionally made to remotely control the multifunctional machine 100.

The first range is a range that is previously defined as a range of the measurement value when the measurement value is determined based on a signal obtained by performing an intentional gesture (for example, waving the hand) that is quicker than in walking.

Furthermore, the second range is a range that is previously defined as a range of the measurement value when the measurement value is determined based on a signal obtained by performing an intentional gesture (for example, clapping) that is quicker than when the hand is waved (the gesture falling within the first range). As described above, in the present embodiment, the quickness of the movement of the person is divided into 3 stages.

As described above, with respect to the speed of change of the signal (the quickness of the gesture), the individual ranges are defined such that a relationship of the low-speed range<the first range holds true. In other words, the first range and the second range are set at a range of the measurement value determined when the signal changes faster than the low-speed range (when the quick gesture is performed). The second range is set at a range of the measurement value determined when the signal changes faster than the first range.

Specifically, in the determination data D shown in FIG. 5, when the measurement value is determined as a frequency f, and it is assumed that the low-speed range is defined as "0≤f≤f1", the first range is defined as "f1≤f<f2" and the second range is defined as "f2≤f", the frequency is higher in the first range than in the low-speed range, the frequency is higher in the second range than in the first range and a relationship of 0<f1<f2 holds true.

When the measurement value is determined as a period t, and it is assumed that the low-speed range is defined as "t2≤t", the first range is defined as "t1≤t<t2" and the second range is defined as "0≤t<t1", the period is lower in the first range than in the low-speed range, the period is lower in the second range than in the first range and a relationship of t1<t2 holds true.

When the measurement value is determined as an interval t, and it is assumed that the low-speed range is defined as "t4≤t", the first range is defined as "t3≤t<t4" and the second range is defined as "0≤t<t3", the interval is lower in the first range than in the low-speed range, the interval is lower in the second range than in the first range and a relationship of t3<t4 holds true.

As described above, to which range the measurement value determined by the signal belongs is determined, and thus it is possible to detect, without any use of a special circuit such as a filter, how quickly the movement or the gesture is performed (what type of movement of the person is performed) onto the pyroelectric sensor 20 (the image forming apparatus).

(Outline of a Power Supply System)

Figure 6:
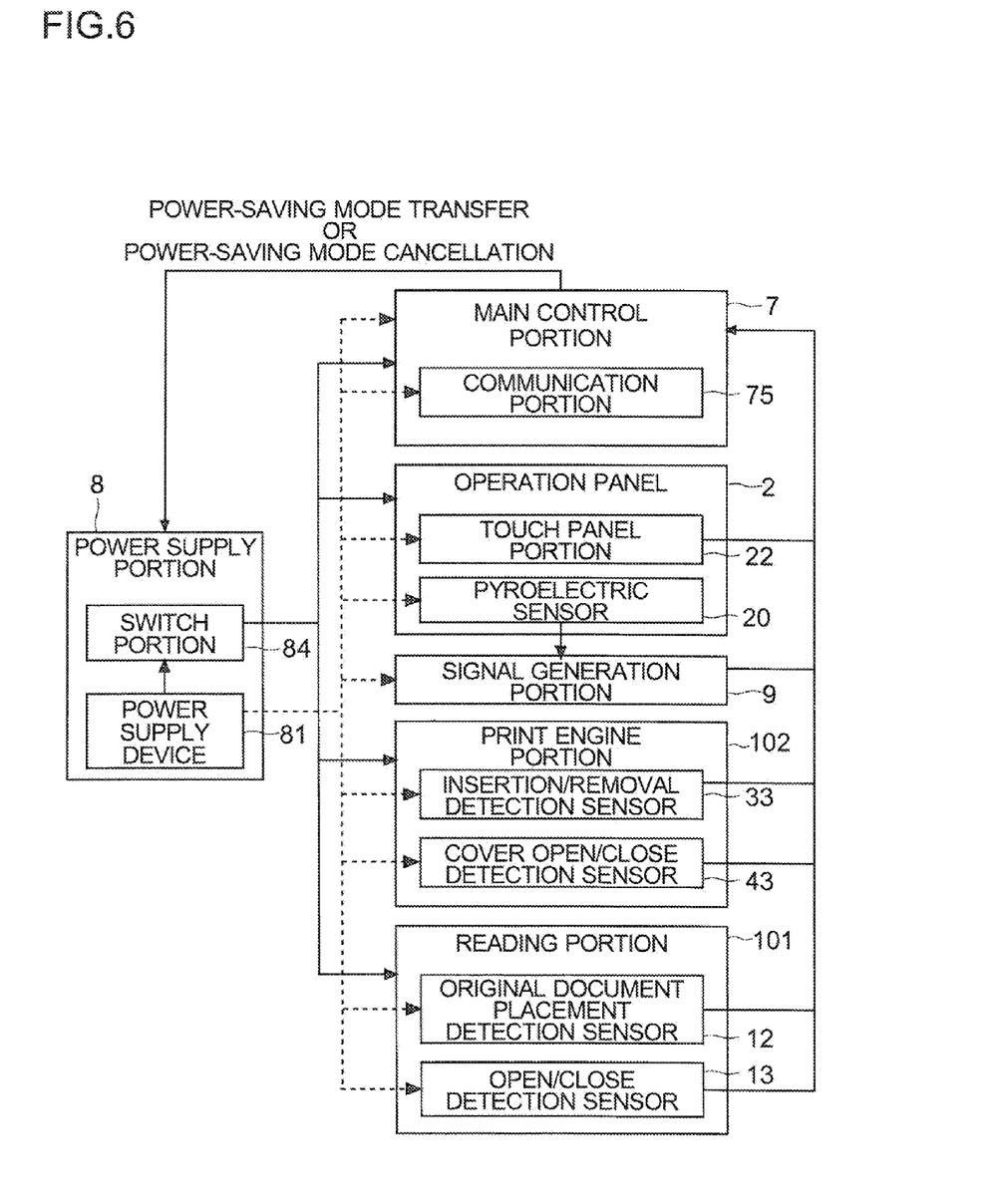
FIG. 6 is a diagram showing a power supply system of the multifunctional machine.

The power supply system of the multifunctional machine 100 according to the embodiment will now be described with reference to FIG. 6. FIG. 6 is a diagram showing the power supply system of the multifunctional machine 100.

As described above, the power supply device 81 of the power supply portion 8 generates various types of voltages. As shown in FIG. 6, the power supply portion 8 includes the switch portion 84. The switch portion 84 includes a plurality of semiconductor switches such as FETs and bipolar transistors, mechanical switches and the like. The switch portion 84 turns on and off, and thereby can switch the passage and the interruption of an electric current to the reading portion 101, the operation panel 2, the print engine portion 102 and the like. In FIG. 6, lines in which the turning on and off of the power supply can be performed by the switch portion 84 are indicated by solid lines.

When the conditions of transfer to the power-saving mode are satisfied, the power supply portion 8 stops the power supply to the operation panel 2, the print engine portion 102, the reading portion 101 and the like to reduce the power consumption. When the power-saving mode is cancelled and returns to the normal mode, the power supply portion 8 supplies power to all or part of the multifunctional machine 100, such as the operation panel 2, the print engine portion 102 and the reading portion 101. Then, in the normal mode, the power supply portion 8 is maintained in a state where the job can be performed.

As indicated by the broken lines of FIG. 6, in order for the remote operation by the user to be received even in the power-saving mode, power is supplied to the pyroelectric sensor 20 and the signal generation portion 9. In order for how fast the movement or the gesture is performed based on the output of the signal generation portion 9 to be recognized, power is supplied to the main control portion 7 even in the power-saving mode. In order for data on a printer job to be received from a computer, power is also supplied to the communication portion 75. In order to lower the power consumption, in the power-saving mode, the main control portion 7 stops a circuit corresponding to an unnecessary function within the main control portion 7 (in the power-saving mode, only part of the main control portion 7 functions).

In order for the occurrence of a factor for return to the normal mode to be detected, even in the power-saving mode, the power supply portion 8 supplies power to a configuration for detecting the cancellation of the power-saving mode (such as a touch panel portion 22, the insertion/removal detection sensor 33, the cover open/close detection sensor 43, the original document placement detection sensor 12 and the open/close detection sensor 13).

(Cancellation of the Power-Saving Mode)

Figure 7:
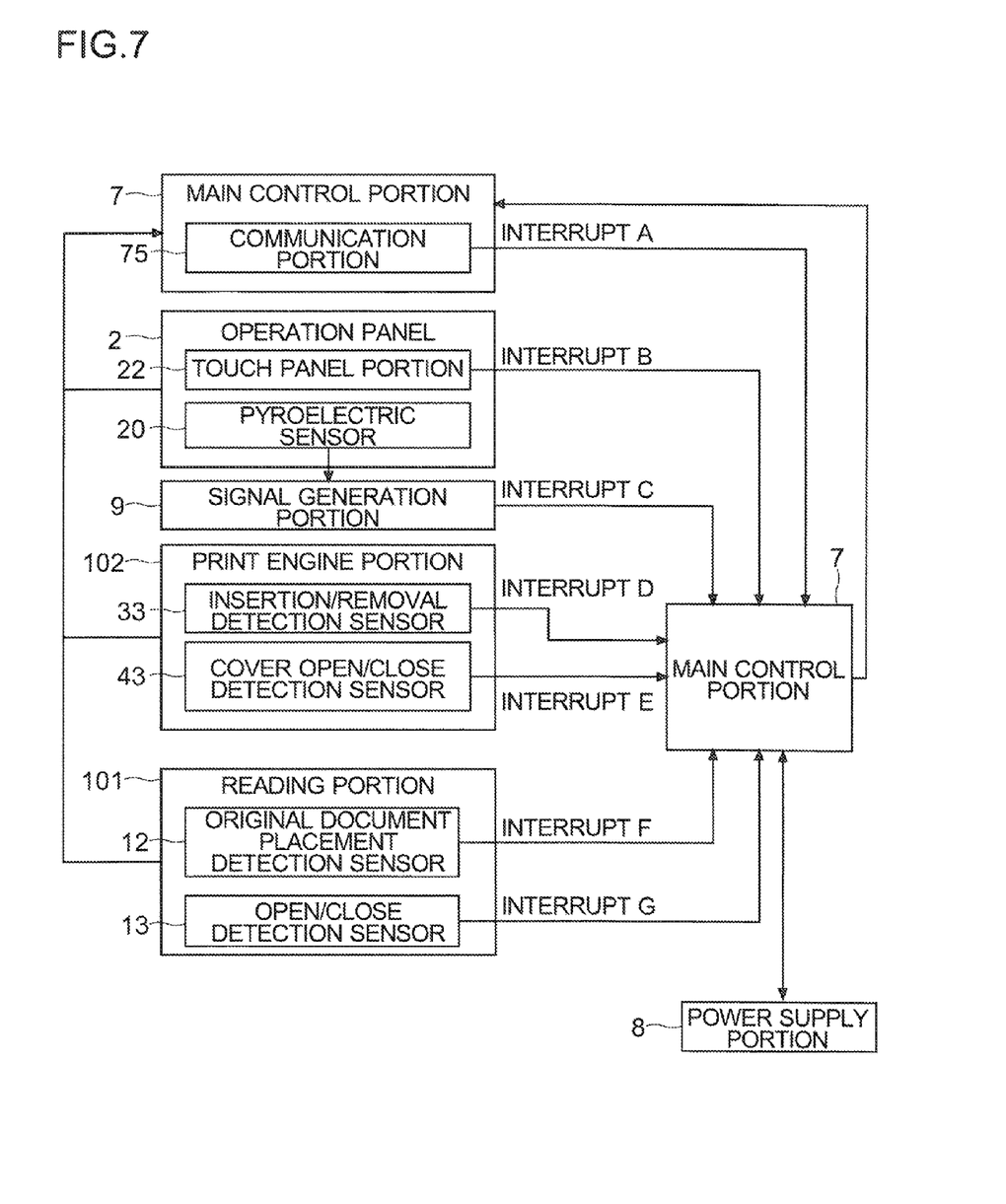
FIG. 7 is a diagram for illustrating the detection of a factor for cancelling a power-saving mode.

The cancellation of the power-saving mode (the return to the normal mode) in the multifunctional machine 100 according to the embodiment will now be described with reference to FIGS. 6 and 7. FIG. 7 is a diagram for illustrating the detection of the factor for cancelling the power-saving mode.

When a predetermined transfer time has elapsed with no operation and no input performed on the multifunctional machine 100 since the main power is supplied or the power-saving mode is cancelled to bright the mode into the normal mode or since the completion of the performance of the job (when a standby state has continued for the predetermined transfer time), the main control portion 7 transfers the mode of the multifunctional machine 100 to the power-saving mode. Alternatively, when a power-saving mode transfer key provided on the operation panel 2 is pressed, the main control portion 7 transfers the multifunctional machine 100 to the power-saving mode. As will be described in detail later, even when the movement or the gesture is performed at a certain speed on the pyroelectric sensor 20, the main control portion 7 also transfers the multifunctional machine 100 to the power-saving mode.

Within the multifunctional machine 100, a plurality of portions (such as the communication portion 75, the touch panel portion 22, the pyroelectric sensor 20, the insertion/removal detection sensor 33, the cover open/close detection sensor 43, the original document placement detection sensor 12 and the open/close detection sensor 13; which are hereinafter referred to as "operation detection portions" for convenience) for detecting the operation of the multifunctional machine 100 are provided. Then, the output of each operation detection portion is transmitted to the main control portion 7. Based on the output of each operation detection portion, the main control portion 7 recognizes whether or not the transfer time has elapsed with no operation and no input performed on the multifunctional machine 100.

Then, when the conditions of the transfer to the power-saving mode are satisfied, the main control portion 7 instructs the power supply portion 8 to transfer to the power-saving mode. Thus, the power supply mode of the power supply portion 8 is changed to the power-saving mode. In the power-saving mode, the power supply portion 8 stops the power supply to predetermined power supply stop portions (the reading portion 101, the operation panel 2 and the print engine portion 102). Hence, the multifunctional machine 100 is brought into a state where the job such as copying or transmission cannot be performed.

In order to cancel the power-saving mode, restart the power supply to the power supply stop portions and perform warm-up processing for bring the multifunctional machine 100 into a state where the multifunctional machine 100 can be utilized, it is necessary to perform an operation of cancelling the power-saving mode on any one of the operation detection portions.

The main control portion 7 receives an interrupt (such as a sensor output) from each operation detection portion as a trigger (a trigger for cancellation of the power-saving mode) of the return from the power-saving mode to the normal mode. When this interrupt is provided, the main control portion 7 makes the power supply portion 8 restart the power supply to part of the main control portion 7, the reading portion 101, the operation panel 2, the print engine portion 102 and the like.

(Flow of the Remote Operation by the Gesture)

Figure 8:
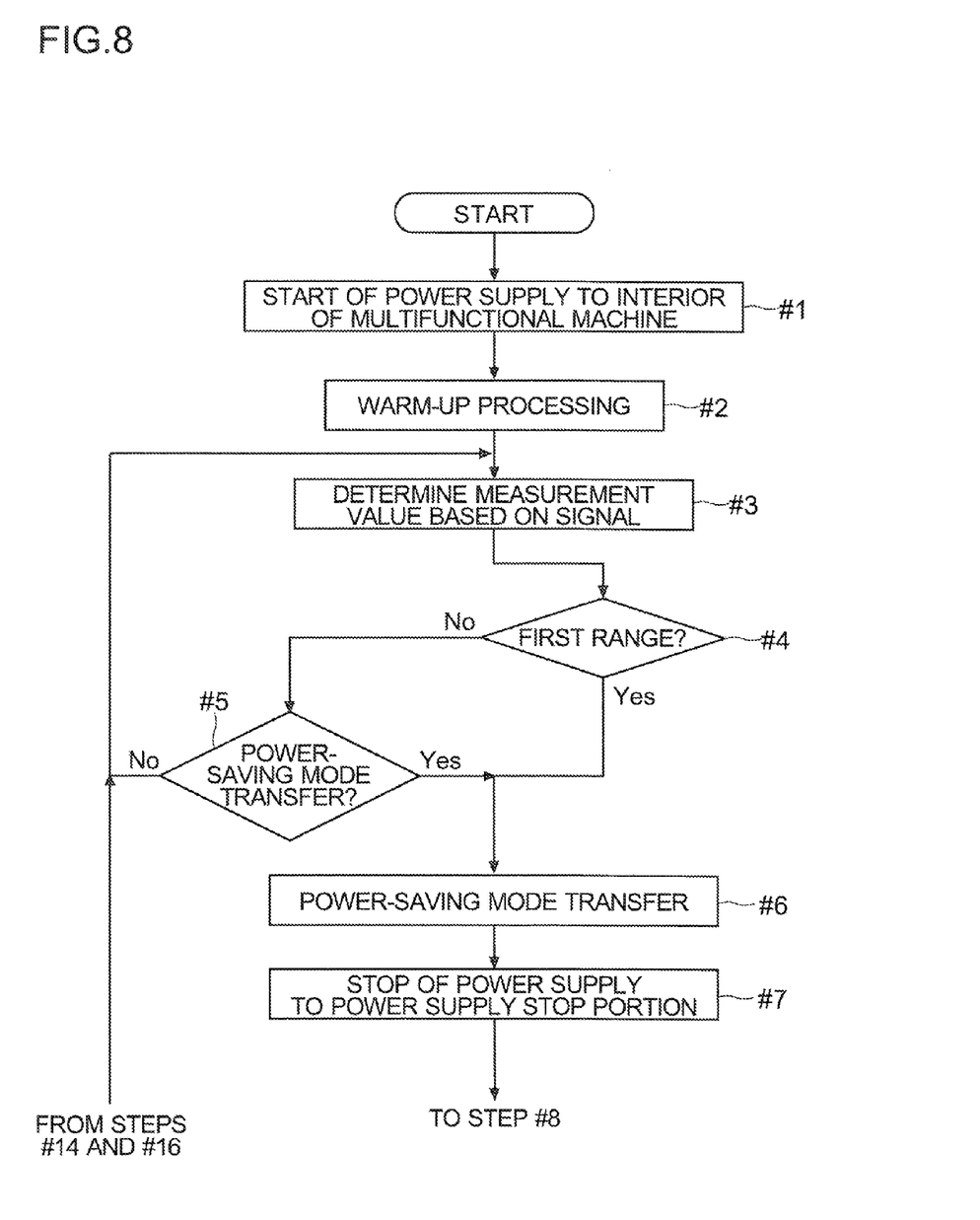
FIG. 8 is a flowchart showing the flow of a remote operation by a gesture.
Figure 9:
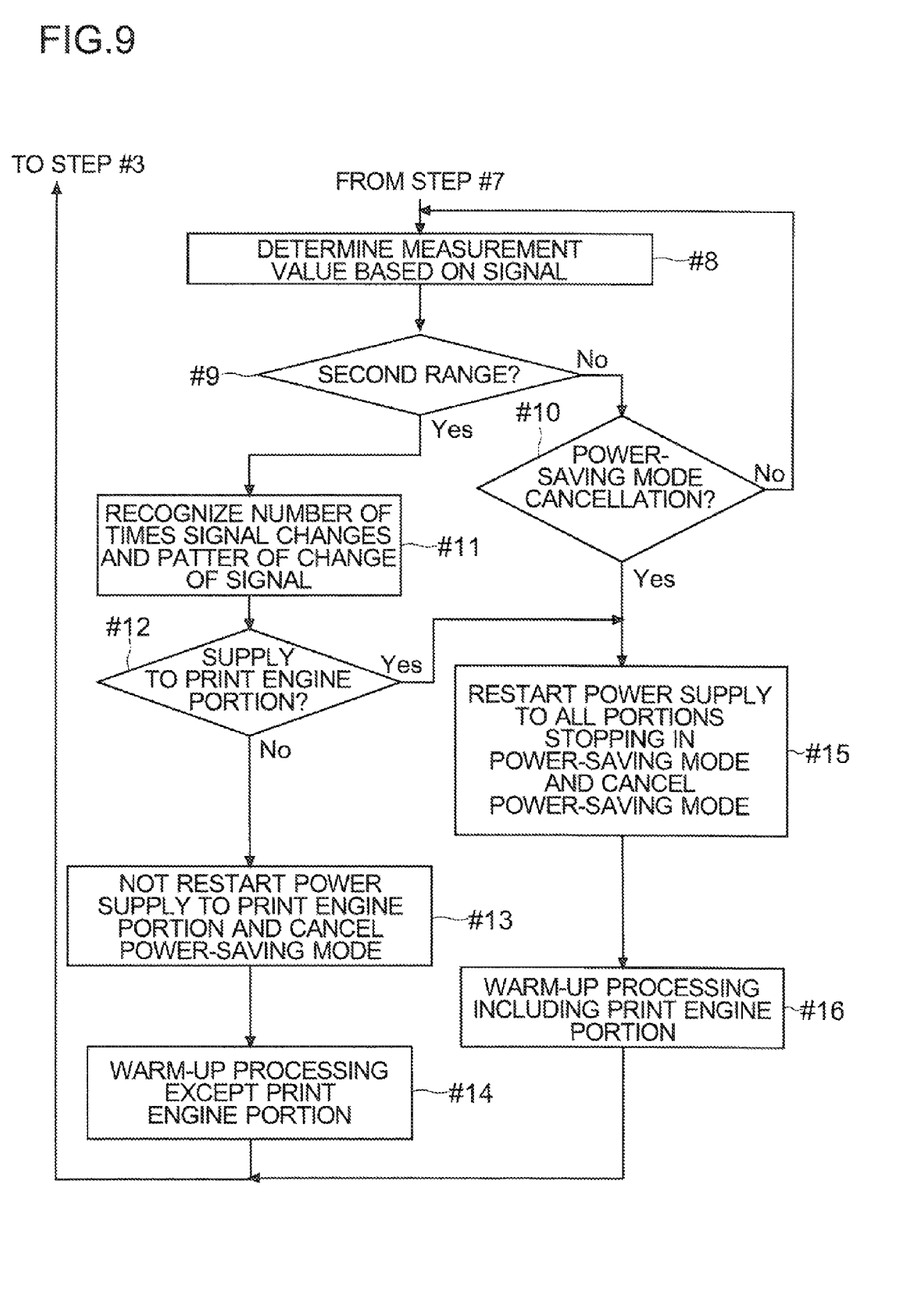
FIG. 9 is a flowchart showing the flow of the remote operation by the gesture.

The flow of the remote operation processing in the multifunctional machine 100 according to the embodiment will now be described with reference to FIGS. 8 and 9. FIGS. 8 and 9 are flowcharts showing the flow of the remote operation by the gesture.

The start of FIG. 8 is a point when the main power of the multifunctional machine 100 is supplied. On the operation panel 2 or the side surface of the multifunctional machine 100, a main power supply switch is provided. The user turns on the switch, and thereby can turn on the power of the multifunctional machine 100 whereas the user turns off the switch, and thereby can turn off the power of the multifunctional machine 100.

When the main power is supplied, the power supply portion 8 starts the power supply to the interior of the multifunctional machine 100 such as the main control portion 7, the reading portion 101, the print engine portion 102 and the operation panel 2 (step #1). Accordingly, power is supplied to all portions within the multifunctional machine 100, and the warm-up processing for bring the multifunctional machine 100 into the state where the multifunctional machine 100 can be utilized is performed (step #2). By the warm-up processing, the main control portion 7, the reading portion 101 and the operation panel 2 are stated up, and, in the print engine portion 102, the agitation of the toner, the warming of the fixing portion 6 and the like are performed. When the main power is supplied, as a result of the warm-up processing, the multifunctional machine 100 is started up in the normal mode where all functions can be utilized.

Then, the main control portion 7 determines the measurement value based on the signal generated by the signal generation portion 9 (step #3). Then, the main control portion 7 determines whether or not the determined measurement value belongs to the first range (step #4). In other words, the main control portion 7 determines whether or not the performance of the gesture for providing an instruction to transfer to the power-saving mode is detected by the pyroelectric sensor 20.

When the measurement value does not belong to the first range (no in step #4), the main control portion 7 determines whether or not it is necessary to transfer to the power-saving mode (step #5). The main control portion 7 determines whether or not the transfer time has elapsed with no operation and no input performed on the multifunctional machine 100 since the completion of the warm-up processing or the completion of the job performance. When it is not necessary to transfer to the power-saving mode (no in step #5), the flow returns to step #3.

On the other hand, when the determined measurement value belongs to the first range (yes in step #4) or when it is necessary to transfer to the power-saving mode (yes in step #5), the main control portion 7 instructs the power supply portion 8 to transfer to the power-saving mode (step #6). The power supply portion 8 receives this instruction, continues the power supply to part of the interior of the multifunctional machine 100 such as part of the main control portion 7, the pyroelectric sensor 20, the signal generation portion 9 and other sensors, and simultaneously stops the power supply to the predetermined power supply stop portions (step #7).

Then, the main control portion 7 determines the measurement value based on the signal generated by the signal generation portion 9 (step #8). Then, the main control portion 7 determines whether or not the determined measurement value belongs to the second range (step #9). In other words, the main control portion 7 determines whether or not the performance of the gesture for providing an instruction to cancel the power-saving mode is detected by the pyroelectric sensor 20.

When the measurement value does not belong to the second range (no in step #9), the main control portion 7 determines whether or not it is necessary to cancel the power-saving mode (step #10). The main control portion 7 determines whether or not the operation detection portion performs an operation or an input on the multifunctional machine 100. When it is not necessary to cancel the power-saving mode (no in step #10), the flow returns to step #8.

On the other hand, when the determined measurement value belongs to the second range (yes in step #9), the main control portion 7 recognizes the number of times the signal has changed or a pattern of change of the signal (step #11). The main control portion 7 determines, based on the output of the pyroelectric sensor 20, whether or not the gesture indicating that the power supply to the print engine portion 102 is not restarted is performed (step #12).

The multifunctional machine 100 is multifunctional. Hence, for the user, there are jobs that do not involve printing such as the reading of the original document and the transmission of the image data obtained by the reading. Although printing is not involved, when even the power supply to the print engine portion 102 is restarted at the time of cancellation of the power-saving mode to perform the warm-up processing (such as the starting up of the engine control portion 102a and the warming of the fixing portion 6), unnecessary power is consumed. Hence, a setting is made such that it is possible to cancel the power-saving mode by the gesture with the power supply to the print engine portion 102 stopped. It is possible to perform, with the simple gesture, the operation on this kind of complicated power-saving mode cancellation.

Specifically, the main control portion 7 determines whether or not the number of times the signal has changed in a predetermined period of time is a predetermined number of times. Then, when the number of times the signal has changed is the predetermined number of times, the main control portion 7 recognizes that the gesture indicating that the power supply to the print engine portion 102 is not restarted is performed. For example, when the number of times the signal has changed falls within a predetermined range such as 5 to 10 times, the main control portion 7 recognizes that a quick movement such as clapping is performed toward the pyroelectric sensor 20 a predetermined number of times with the intention that the power supply to the print engine portion 102 is not restarted.

The main control portion 7 also recognizes whether or not the pattern of change of the signal is a predetermined change pattern. Then, when the pattern of change corresponds to the predetermined change pattern, the main control portion 7 recognizes that the gesture indicating that the power supply to the print engine portion 102 is not restarted is performed. For example, when less than a few seconds after the signal has changed one or a plurality of number of times, the signal has changed one or a plurality of number of times (in this case, in terms of rhythm, after clapping has performed one or a plurality of number of times, a rest is taken, and clapping is performed again one or a plurality of number of times). The main control portion 7 recognizes that a quick movement such as clapping is performed toward the pyroelectric sensor 20 in a predetermined pattern with the intention that the power supply to the print engine portion 102 is not restarted.

When the gesture indicating that the power supply to the print engine portion 102 is not restarted is performed (no in step #12), the main control portion 7 does not restart the power supply to the print engine portion 102, and makes the power supply portion 8 perform the power supply to the other power supply stop portions such as the reading portion 101 to cancel the power-saving mode (step #13). Thus, in the multifunctional machine 100, except the print engine portion 102, the warm-up processing is started (step #14). Then, the flow returns to step #3.

After return to the power-saving mode, when the user desires to perform the job (copying or printing) using the print engine portion 102, the user preferably performs an operation or an input on the printing on the multifunctional machine 100 such as the touching of the operation panel 2 on the job, such as copying, involving printing and the inputting of print data to the communication portion 75. Then, when the operation or the input on printing is detected, the main control portion 7 makes the power supply portion 8 restart the power supply to the print engine portion 102.

On the other hand, when the gesture indicating that the power supply to the print engine portion 102 is not restarted is not performed (yes in step #12) or when the power-saving mode needs to be cancelled because the operation or the input on the multifunctional machine 100 is performed due to a factor other than the remote operation on the pyroelectric sensor 20 (yes in step #10), the main control portion 7 makes the power supply portion 8 restart the power supply to all the power supply stop portions including the reading portion 101 and the print engine portion 102 in the power-saving mode to cancel the power-saving mode (step #15). Thus, in the multifunctional machine 100, including the print engine portion 102, the warm-up processing is started (step #16). Then, the flow returns to step #3.

Thus, an image forming apparatus according to the present embodiment includes: the pyroelectric sensor 20; the signal generation portion 9 that receives an output of the pyroelectric sensor 20 to generate a different level of signal according to whether or not an output value of the pyroelectric sensor 20 exceeds a predetermined threshold value; the recognition portion (the main control portion 7) that receives the signal generated by the signal generation portion 9, that determines a measurement value on the speed of change of the signal and that recognizes to which of a predetermined first range and a predetermined second range different from the first range the determined measurement value belongs; and the power supply portion 8 in which, when the determined measurement value falls within the first range in a mode other than the power-saving mode, power is supplied to only part of the image forming apparatus, and the image forming apparatus is brought into the power-saving mode, and, when the determined measurement value falls within the second range in the power-saving mode, power supply is restarted to all or part of portions to which power has been stopped to be supplied in the power-saving mode, and the power-saving mode is cancelled.

Thus, the speed at which the hand is waved toward the pyroelectric sensor 20 is only adjusted such that the image forming apparatus (the multifunctional machine 100) performs the desired operation, and thus it is possible to remotely operate the transfer to and the cancellation of the power-saving mode in a simplified manner. For example, when the user waves the hand or claps toward the image forming apparatus at his seat to cancel the power-saving mode in the image forming apparatus, and thereafter moves toward the image forming apparatus, as compared with the case where the power-saving mode is cancelled after the image forming apparatus is reached, it is possible to reduce a time during which the user has waited since the cancellation of the power-saving mode until the image forming apparatus becomes available. It is not necessary to adopt a circuit configuration in which a filter portion is provided in a sensor, and thus it is possible to reduce the manufacturing cost of the image forming apparatus. Since the method of the remote operation of the image forming apparatus and its details depend on the speed of change of the signal based on the output of the pyroelectric sensor 20, the user can remotely operate the mode of the image forming apparatus by a movement of changing the amount of infrared ray from the human body entering the pyroelectric sensor 20 such as the movement of the waving of the hand, the movement of the head and the movement of the leg. By focusing on the speed of change of the signal and determining the speed of change, it is possible to accurately detect the details of the movement of the person toward the pyroelectric sensor 20.

The low-speed range is previously determined as a range of the measurement value, and the first range and the second range are set at a range of the measurement value determined when the signal changes faster than the low-speed range. Thus, by a movement slower than the gesture performed for the transfer to or the cancellation of the power-saving mode, it is possible to prevent the image forming apparatus (the multifunctional machine 100) from erroneously transferring to the power-saving mode and the power-saving mode from being erroneously cancelled. In other words, it is possible to prevent any motion (such as the slight movement of the head, the raising of the hair or the stretching out) that is not intended for the user to perform the remote operation from being erroneously detected as the movement for switching the mode of the image forming apparatus. For example, the low-speed range is set at a range of the measurement value determined when the walking user crosses the detection area of the pyroelectric sensor 20 or is approaching the image forming apparatus.

The second range is set at a range of the measurement value determined when the signal changes faster than the first range. Thus, in order to cancel the power-saving mode, it is necessary to perform, on the pyroelectric sensor 20, a movement quicker than when the image forming apparatus is transferred to the power-saving mode. Hence, the power-saving mode is unlikely to be cancelled by an erroneous detection, and it is possible to keep low the power consumption of the image forming apparatus (the multifunctional machine 100). On the other hand, even when a slightly quick movement is performed toward the pyro electric sensor 20, the image forming apparatus only transfers to the power-saving mode, and thus it is possible to prevent unnecessary power consumption in the image forming apparatus.

When the image forming apparatus is brought into the power-saving mode, the power supply portion 8 stops power supply to the reading portion 10 that reads the original document and the print engine portion 102 that performs printing on a sheet, when the measurement value within the second range is determined in the power-saving mode, the recognition portion (the main control portion 7) recognizes the number of times the signal has changed and when the number of times the signal has changed is a predetermined number, the power supply portion 8 restarts the power supply to the reading portion 101 but does not restart the power supply to the print engine portion 102 whereas, when the number of times the signal has changed is not the predetermined number, the power supply portion 8 restarts the power supply to the reading portion 101 and the print engine portion 102. Thus, it is possible to select the portion on which the power-saving mode is cancelled, by the number of times the operation or the gesture for cancelling the power-saving mode is performed. Hence, it is possible to finely detect the gesture and perform the remote operation so as to prevent the power supply from being restarted to all portions of the image forming apparatus (the multifunctional machine 100) by the cancellation of the power-saving mode. The power supply is not restarted to the portion that is used, and thus it is possible to reduce the power consumption in the image forming apparatus.

Preferably, by contrast, when the image forming apparatus is brought into the power-saving mode, the power supply portion 8 stops power supply to the reading portion 101 that reads the original document and the print engine portion 102 that performs printing on a sheet, when the measurement value within the second range is determined in the power-saving mode, the recognition portion (the main control portion 7) recognizes the number of times the signal has changed and when the number of times the signal has changed is not a predetermined number, the power supply portion 8 restarts the power supply to the reading portion 101 but does not restart the power supply to the print engine portion 102 whereas, when the number of times the signal has changed is the predetermined number, the power supply portion 8 restarts the power supply to the reading portion 101 and the print engine portion 102 (step #11 in FIG. 9). Even in this case, it is possible to select the portion on which the power-saving mode is cancelled.

When the image forming apparatus is brought into the power-saving mode, the power supply portion 8 stops power supply to the reading portion 101 that reads the original document and the print engine portion 102 that performs printing on a sheet, the recognition portion (the main control portion 7) recognizes a pattern of change of the signal obtained when the measurement value within the second range is determined in the power-saving mode and when the recognition portion (the main control portion 7) recognizes that the pattern of change corresponds to a predetermined change pattern, the power supply portion 8 restarts the power supply to the reading portion 101 but does not restart the power supply to the print engine portion 102 whereas, when the recognition portion recognizes that the pattern of change does not correspond to the predetermined change pattern, the power supply portion 8 restarts the power supply to the reading portion 101 and the print engine portion 102. Thus, it is possible to select the portion on which the power-saving mode is cancelled, by a pattern (rhythm) of performing the operation or the gesture for cancelling the power-saving mode. Hence, it is possible to finely detect the gesture and perform the remote operation so as to prevent the power supply from being restarted to all portions of the image forming apparatus (the multifunctional machine 100) by the cancellation of the power-saving mode. The power supply is not restarted to the portion that is used, and thus it is possible to reduce the power consumption in the image forming apparatus.

Preferably, by contrast, when the image forming apparatus is brought into the power-saving mode, the power supply portion 8 stops power supply to the reading portion 101 that reads the original document and the print engine portion 102 that performs printing on a sheet, the recognition portion (the main control portion 7) recognizes a pattern of change of the signal obtained when the measurement value within the second range is determined in the power-saving mode and when the recognition portion recognizes that the pattern of change does not correspond to a predetermined change pattern, the power supply portion 8 restarts the power supply to the reading portion 101 but does not restart the power supply to the print engine portion 102 whereas, when the recognition portion recognizes that the pattern of change corresponds to the predetermined change pattern, the power supply portion 8 restarts the power supply to the reading portion 101 and the print engine portion 102 (step #11 in FIG. 9). Even in this case, by a pattern (rhythm) of performing the gesture, it is possible to select the portion on which the power-saving mode is cancelled.

The recognition portion (the main control portion 7) determines, as the measurement value, one or a plurality of a frequency of change of the level of the signal, a period of change of the level of the signal and an interval from an edge of change of the signal to an edge. Thus, it is possible to determine indexes on the speed of change of the signal that are the frequency, the period and the interval from the edge to the edge without any use of a special filter passing through only a specific frequency.

The number of pyroelectric sensor 20 is one. Thus, it is possible to extremely inexpensively detect the gesture that is intended to operate the image forming apparatus (the multifunctional machine 100). Moreover, it is possible to accurately detect the gesture even with one pyroelectric sensor 20 and to accurately and remotely operate the image forming apparatus.

The details of the disclosure described above can also be regarded as an method invention.

Although the embodiment of the present disclosure has been described, the scope of the present disclosure is not limited to this embodiment, and various modifications are possible without departing from the spirit of the disclosure.

Although in the embodiment described above, the main control portion 7 determines the measurement value based on the output of the signal generation portion 9 to recognize to which range the measurement value belongs, for example, a portion other than the main control portion 7 such as a special substrate, the engine control portion 102*a* or the control portion within the operation panel 2 may function as the recognition portion.

What is claimed is:

1. An image forming apparatus comprising:
a print engine portion that performs printing on a sheet;
a pyroelectric sensor;
a signal generation portion that receives an output of the pyroelectric sensor to generate a different level of signal according to whether or not an output value of the pyroelectric sensor exceeds a predetermined threshold value;
a recognition portion that:
receives the signal generated by the signal generation portion and determines, as a measurement value on a speed of change of the signal, one of a frequency, a period, and an edge-to-edge interval;
recognizes to which of a predetermined first range and a predetermined second range different from the first range the determined measurement value belongs;
recognizes a number of times the signal has changed or a pattern of change of the signal; and
recognizes, either by whether or not the change of the signal is a predetermined number of times or by whether or not the change of the signal is a predetermined pattern of change, whether or not a gesture indicating that power supply to the print engine portion is not restarted is performed; and
a power supply portion in which,
in a mode other than a power-saving mode,
in a case where the determined measurement value falls within the first range, power is supplied to only part of the image forming apparatus, and the image forming apparatus is brought into the power-saving mode, and,
in the power-saving mode,
in a case where, as when the determined measurement value falls within the second range, the gesture indicating that the power supply to the print engine portion is not restarted is performed, with the power supply to the print engine portion stopped, the power-saving mode is cancelled, and
in a case where, even when the determined measurement value falls within the second range, a gesture different from the gesture indicating that the power supply to the print engine portion is not restarted is performed, the power supply to the print engine portion is restarted and the power-saving mode is cancelled,
wherein
in the power-saving mode, in a case where the determined measurement value does not fall within the second range, the recognition portion determines whether or not to cancel the power-saving mode based on operation or input on the image forming apparatus, and when the power-saving mode has to be canceled, the power supply portion cancels the power-saving mode by restarting power supply to all portions to which power has been stopped to be supplied in the power-saving mode.

2. The image forming apparatus of claim 1,
wherein a low-speed range is previously determined as a range of the measurement value, and
the first range and the second range are set at a range of the measurement value determined when the signal changes faster than the low-speed range.

3. The image forming apparatus of claim 1,
wherein the second range is set at a range of the measurement value determined when the signal changes faster than the first range.

4. The image forming apparatus of claim 1,
wherein, when the image forming apparatus is brought into the power-saving mode, the power supply portion stops power supply to a reading portion that reads an original document and a print engine portion that performs printing on a sheet,
when the measurement value within the second range is determined in the power-saving mode, the recognition portion recognizes a number of times the signal has changed and
when the number of times the signal has changed is a predetermined number, the power supply portion restarts the power supply to the reading portion but does not restart the power supply to the print engine portion whereas, when the number of times the signal has changed is not the predetermined number, the power supply portion restarts the power supply to the reading portion and the print engine portion.

5. The image forming apparatus of claim 1,
wherein, when the image forming apparatus is brought into the power-saving mode, the power supply portion stops power supply to a reading portion that reads an original document and a print engine portion that performs printing on a sheet,
when the measurement value within the second range is determined in the power-saving mode, the recognition portion recognizes a number of times the signal has changed and
when the number of times the signal has changed is not a predetermined number, the power supply portion restarts the power supply to the reading portion but does not restart the power supply to the print engine portion whereas, when the number of times the signal has changed is the predetermined number, the power supply portion restarts the power supply to the reading portion and the print engine portion.

6. The image forming apparatus of claim 1,
wherein, when the image forming apparatus is brought into the power-saving mode, the power supply portion stops power supply to a reading portion that reads an original document and a print engine portion that performs printing on a sheet,
the recognition portion recognizes a pattern of change of the signal obtained when the measurement value within the second range is determined in the power-saving mode and
when the recognition portion recognizes that the pattern of change corresponds to a predetermined change pattern, the power supply portion restarts the power supply to the reading portion but does not restart the power supply to the print engine portion whereas, when the recognition portion recognizes that the pattern of change does not correspond to the predetermined change pattern, the power supply portion restarts the power supply to the reading portion and the print engine portion.

7. The image forming apparatus of claim 1,
wherein, when the image forming apparatus is brought into the power-saving mode, the power supply portion stops power supply to a reading portion that reads an original document and a print engine portion that performs printing on a sheet,
the recognition portion recognizes a pattern of change of the signal obtained when the measurement value within the second range is determined in the power-saving mode and
when the recognition portion recognizes that the pattern of change does not correspond to a predetermined change pattern, the power supply portion restarts the power supply to the reading portion but does not restart the power supply to the print engine portion whereas, when the recognition portion recognizes that the pattern of change corresponds to the predetermined change pattern, the power supply portion restarts the power supply to the reading portion and the print engine portion.

8. The image forming apparatus of claim 1,
wherein the recognition portion determines, as the measurement value, one or a plurality of a frequency of change of the level of the signal, a period of change of the level of the signal and an interval from an edge of change of the signal to an edge.

9. The image forming apparatus of claim 1,
wherein the number of the pyroelectric sensor is one.

10. A method of controlling an image forming apparatus, comprising the steps of:
generating a different level of signal according to whether or not an output value of a pyroelectric sensor exceeds a predetermined threshold value;
determining a measurement value on a speed of change of the signal, one of a frequency, a period, and an edge-to-edge interval, a number of times the signal has changed or, a pattern of change of the signal;
recognizing to which of a predetermined first range and a predetermined second range different from the first range the determined speed measurement value belongs and whether or not a gesture indicating that power supply to a print engine portion is not reinstated has been performed, based on the determined number of changes of the signal or the determined change pattern of the signal; and
supplying power to only part of the image forming apparatus and bringing the image forming apparatus into the power-saving mode when the determined measurement value falls within the first range in a mode other than a power-saving mode; and
restarting power supply to all or part of portions to which power has been stopped to be supplied in the power-saving mode and cancelling the power-saving mode when the determined measurement value falls within the second range in the power-saving mode, and when, with the power supply to the print engine portion stopped, the gesture has been performed indicating that the power supply to the print engine portion is not restarted;
determining, in the power-saving mode, in a case where, as when the determined measurement value does not fall within the second range, whether or not to cancel the power-saving mode based on operation or input on the image forming apparatus, and
cancelling, when the power-saving mode has to be canceled, the power-saving mode by restarting power supply to all portions to which power has been stopped to be supplied in the power-saving mode.

11. The method of controlling an image forming apparatus according to claim 10,
wherein a low-speed range is previously determined as a range of the measurement value, and
the first range and the second range are set at a range of the measurement value determined when the signal changes faster than the low-speed range.

12. The method of controlling an image forming apparatus according to claim 10,
wherein the second range is set at a range of the measurement value determined when the signal changes faster than the first range.

13. The method of controlling an image forming apparatus according to claim 10,
wherein, when the image forming apparatus is brought into the power-saving mode, power supply to a reading portion that reads an original document and a print engine portion that performs printing on a sheet is stopped,
when the measurement value within the second range is determined in the power-saving mode, a number of times the signal has changed is recognized and
when the number of times the signal has changed is a predetermined number, the power supply to the reading portion is restarted but the power supply to the print engine portion is not restarted whereas, when the number of times the signal has changed is not the predetermined number, the power supply to the reading portion and the print engine portion is restarted.

14. The method of controlling an image forming apparatus according to claim 10,
wherein, when the image forming apparatus is brought into the power-saving mode, power supply to a reading portion that reads an original document and a print engine portion that performs printing on a sheet is stopped,
when the measurement value within the second range is determined in the power-saving mode, a number of times the signal has changed is recognized and
when the number of times the signal has changed is not a predetermined number, the power supply to the reading portion is restarted but the power supply to the print engine portion is not restarted whereas, when the number of times the signal has changed is the predetermined number, the power supply to the reading portion and the print engine portion is restarted.

15. The method of controlling an image forming apparatus according to claim 10,
wherein, when the image forming apparatus is brought into the power-saving mode, power supply to a reading portion that reads an original document and a print engine portion that performs printing on a sheet is stopped,
a pattern of change of the signal obtained when the measurement value within the second range is determined in the power-saving mode is recognized and
when that the pattern of change corresponds to a predetermined change pattern is recognized, the power supply to the reading portion is restarted but the power supply to the print engine portion is not restarted whereas, when that the pattern of change does not correspond to the predetermined change pattern is recognized, the power supply to the reading portion and the print engine portion is restarted.

16. The method of controlling an image forming apparatus according to claim 10,
wherein, when the image forming apparatus is brought into the power-saving mode, power supply to a reading portion that reads an original document and a print engine portion that performs printing on a sheet is stopped, a pattern of change of the signal obtained when the measurement value within the second range is determined in the power-saving mode is recognized and when that the pattern of change does not correspond to a predetermined change pattern is recognized, the power supply to the reading portion is restarted but the power supply to the print engine portion is not restarted whereas, when that the pattern of change corresponds to the predetermined change pattern is recognized, the power supply to the reading portion and the print engine portion is restarted.

17. The method of controlling an image forming apparatus according to claim 10, wherein one or a plurality of a frequency of change of the level of the signal, a period of change of the level of the signal and an interval from an edge of change of the signal to an edge is determined as the measurement value.

18. The method of controlling an image forming apparatus according to claim 10, wherein only the one pyroelectric sensor is provided in the image forming apparatus.

\* \* \* \* \*